United States Patent
Kikta

[19]

[11] Patent Number: 6,064,657
[45] Date of Patent: May 16, 2000

[54] METHOD AND SYSTEM FOR TRANSMITTING DATA USING A MODEM WITH A DIRECTIONAL CONTROL MECHANISM

[75] Inventor: Christopher E. Kikta, Pittsburgh, Pa.

[73] Assignee: Innovex Technologies, Turtle Creek, Pa.

[21] Appl. No.: 08/874,111

[22] Filed: Jun. 12, 1997

[51] Int. Cl.[7] ............................................. H04J 3/02
[52] U.S. Cl. ................. 370/284; 370/285; 370/402; 375/222
[58] Field of Search ........................... 370/401, 402, 370/462, 447, 282, 284, 285; 375/222

[56] References Cited

U.S. PATENT DOCUMENTS

| | | | |
|---|---|---|---|
| 5,025,500 | 6/1991 | Phinney | 370/462 |
| 5,355,365 | 10/1994 | Bhat et al. | 370/401 |
| 5,628,030 | 5/1997 | Tuckner | 395/884 |
| 5,790,895 | 8/1998 | Krontz et al. | 395/884 |

*Primary Examiner*—Min Jung
*Attorney, Agent, or Firm*—Ansel M. Schwartz

[57] ABSTRACT

The present invention pertains to a system for transmitting data. The system comprises a network on which free topology transmission of data occurs. The system comprises a first node. The system comprises a second node. The system comprises a shared free topology modem connected to the network and the first and second nodes for transmitting signals from the first and second nodes. The present invention pertains to a method for transmitting data. The method comprises the steps of transmitting data from a first node on a balanced line two-wire differential network to a free topology modem. Next there is the step of transmitting the data from the first node to the free topology network on which free topology transmission of data occurs with the free topology modem. Then there is the step of transmitting data from a second node on the balanced line two-wire differential network to the free topology transceiver. Next there is the step of transmitting the data from the second node to the free topology network with the free topology modem.

8 Claims, 4 Drawing Sheets

FIG.3

METHOD AND SYSTEM FOR TRANSMITTING DATA USING A MODEM WITH A DIRECTIONAL CONTROL MECHANISM

FIELD OF THE INVENTION

The present invention is related to the transmission of data. More specifically, the present invention is related to many nodes sharing a free topology modem.

BACKGROUND OF THE INVENTION

The purpose of the invention is to enable the sharing of a specialty FTT10A transceiver among several to many Echelon Neuron nodes where the FTT10A transceiver was originally designed for and marketed as suitable for, one and only one node. It is desirable to share the FTT10A transceiver among as many nodes as possible due to the cost of the FTT10A transceiver. An FTT10A transceiver alone costs approximately $20US whereas an EIA485 transceiver costs approximately $1US.

The Neuron was specifically designed with an interface to an EIA485 transceiver (LonWorks Technology Device Data User's Guide, pages 4–9 to 4–15, incorporated by reference herein) in a single-ended mode or to a FTT10A (FTT10A Free Topology Transceiver User's Guide) also in a single-ended mode (there are also other transceivers types which are not relevant to this application). Normally, the Neurons are networked based on a local topology of all EIA485 based nodes or all FTT10A (and LPT10A self-powered) nodes (among others), with all interfacing between different network topologies requiring an intelligent router device costing $300US and up.

The invention substitutes an EIA485 transceiver to EIA485 transceiver based balanced line differential pair network intervening between the normal single-ended mode interface on the Neuron and the single-ended mode interface on the FTT10A transceiver. Direction control is independent of the information content and is solely based on line activity. The invention enables the construction of larger topologies than what could be realized without intelligent routers being required every 32 nodes approximately. In other words, where an FTT10A topology alone could contain up to 32 nodes or an EIA485 topology alone could contain up to 128 nodes without requiring an intelligent router, the combined topology could be comprised of up to 32×128 or 4096 total nodes before requiring an intelligent router.

SUMMARY OF THE INVENTION

The present invention pertains to a system for transmitting data. The system comprises a network on which free topology transmission of data occurs. The system comprises a first node. The system comprises a second node. The system comprises a shared free topology modem connected to the network and the first and second nodes for transmitting signals from the first and second nodes.

The present invention pertains to a method for transmitting data. The method comprises the steps of transmitting data from a first node on a balanced line two-wire differential network to a free topology modem. Next there is the step of transmitting the data from the first node to the free topology network on which free topology transmission of data occurs with the free topology modem. Then there is the step of transmitting data from a second node on the balanced line two-wire differential network to the free topology transceiver. Next there is the step of transmitting the data from the second node to the free topology network with the free topology modem. Preferably, either node can also transmit and receive data to and from each other in the balanced line, two-wire differential network.

BRIEF DESCRIPTION OF THE DRAWINGS

In the accompanying drawings, the preferred embodiment of the invention and preferred methods of practicing the invention are illustrated in which:

FIG. 3 are graphs representing received data of the present invention regarding FIG. 2.

DESCRIPTION OF THE PREFERRED EMBODIMENT

Figure 1:
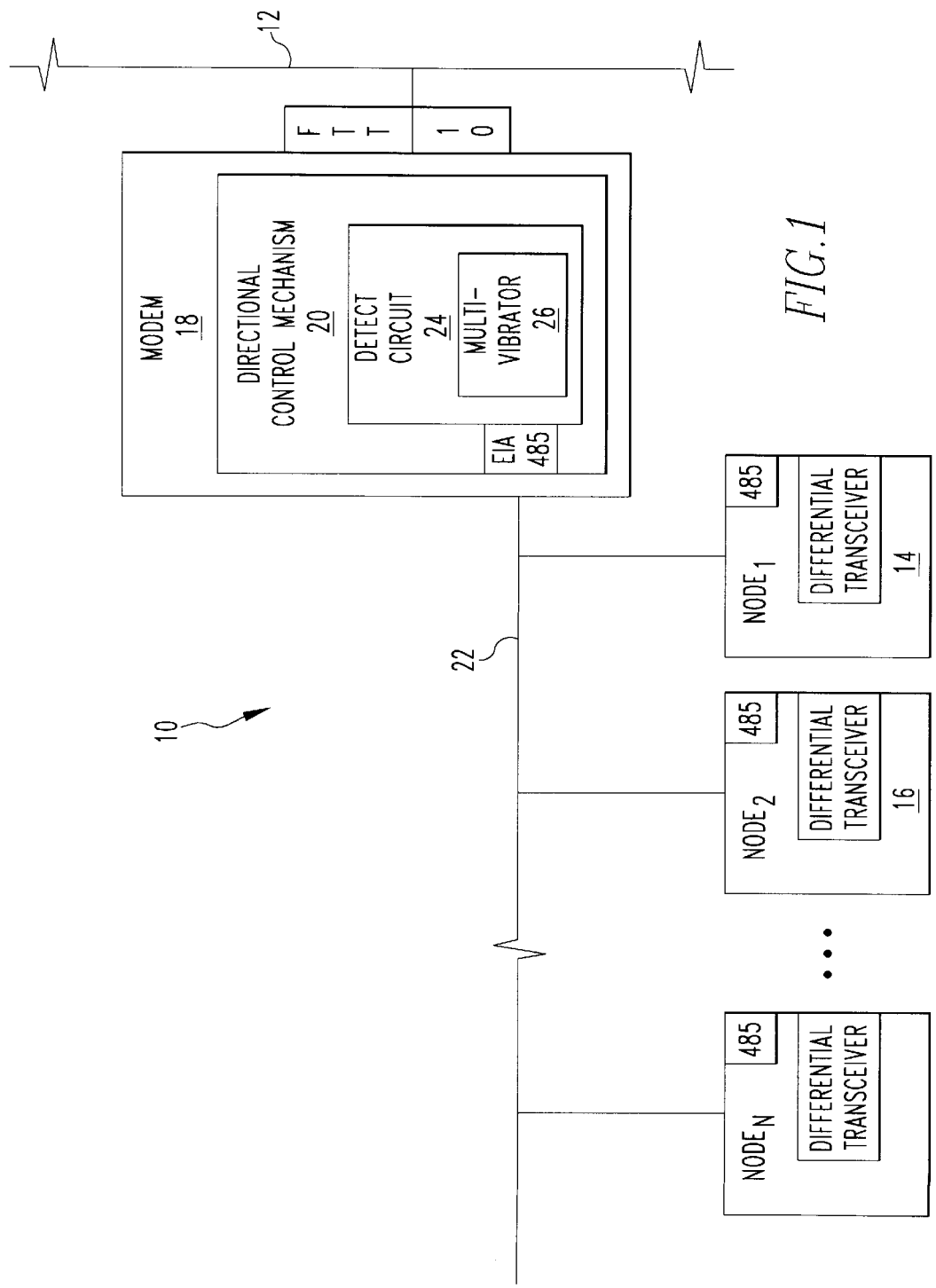
FIG. 1 is a schematic representation of the present invention.

Referring now to the drawings wherein like reference numerals refer to similar or identical parts throughout the several views, and more specifically to FIG. 1 thereof, there is shown a system 10 for transmitting data. The system 10 comprises a network 12 on which free topology transmission of data occurs. The system 10 comprises a first node 14. The system 10 comprises a second node 16. The system 10 comprises a shared free topology modem 18 connected to the network 12 and the first and second nodes for transmitting signals from the first and second nodes.

The modem 18 preferably receives signals for the first and second nodes. Preferably, the system 10 includes a directional control mechanism 20 connected to the network 12 for controlling when the nodes can receive signals via the modem 18 from the network 12. Preferably, the directional control mechanism 20 includes an edge detect 24 which detects when data is received by the modem 18 from the network 12. Preferably, the directional control mechanism 20 includes a multi-vibrator 26 which enables data from the network 12 to pass through the motion to the nodes. The modem 18 preferably includes an FTT10A transceiver connected to the multi-vibrator 26.

Each node preferably includes a balanced line differential transceiver. Preferably, each balanced line differential transceiver is an EIA485 device. Preferably, the system 10 includes a balanced line two-wire differential network 22 connected to each EIA485 device.

The present invention pertains to a method for transmitting data. The method comprises the steps of transmitting data from a first node 14 on a balanced line two-wire differential network 22 to a free topology modem 18. Next there is the step of transmitting the data from the first node 14 to the free topology network 12 on which free topology transmission of data occurs with the free topology modem 18. Then there is the step of transmitting data from a second node 16 on the balanced line two-wire differential network 22 to the free topology transceiver. Next there is the step of transmitting the data from the second node 16 to the free topology network 12 with the free topology modem 18.

Preferably, after the step of transmitting the data from the second node 16 to the free topology network 12, there is the step of receiving data from the free topology network 12 at the free topology transceiver and transmitting the data from the free topology transceiver to the first and second nodes.

Preferably, the step of receiving data from the free topology network 12 at the free topology transceiver includes the step of detecting a leading or active edge signal of data from the free topology network 12 at the free topology modem 18 and allowing the data from the free topology network 12 to pass to the first and second nodes.

After the step of detecting a leading or active edge signal of data, there is preferably the step of causing the free topology modem 18 to revert to a quiescent state which allows data from the first and second nodes to pass to the free topology transceiver and be sent to the free topology network 12 by the free topology modem 18.

The preferred embodiment is comprised of the following functions:

1. An EIA485 based balanced line differential transceiver,
2. An FTT10A free topology transceiver (modem) with a local 10 Mhz clock,
3. An edge detect circuit to detect FTT10A received data activity and switch the data direction on the EIA485 transceiver,
4. A local power supply.

Figure 2:
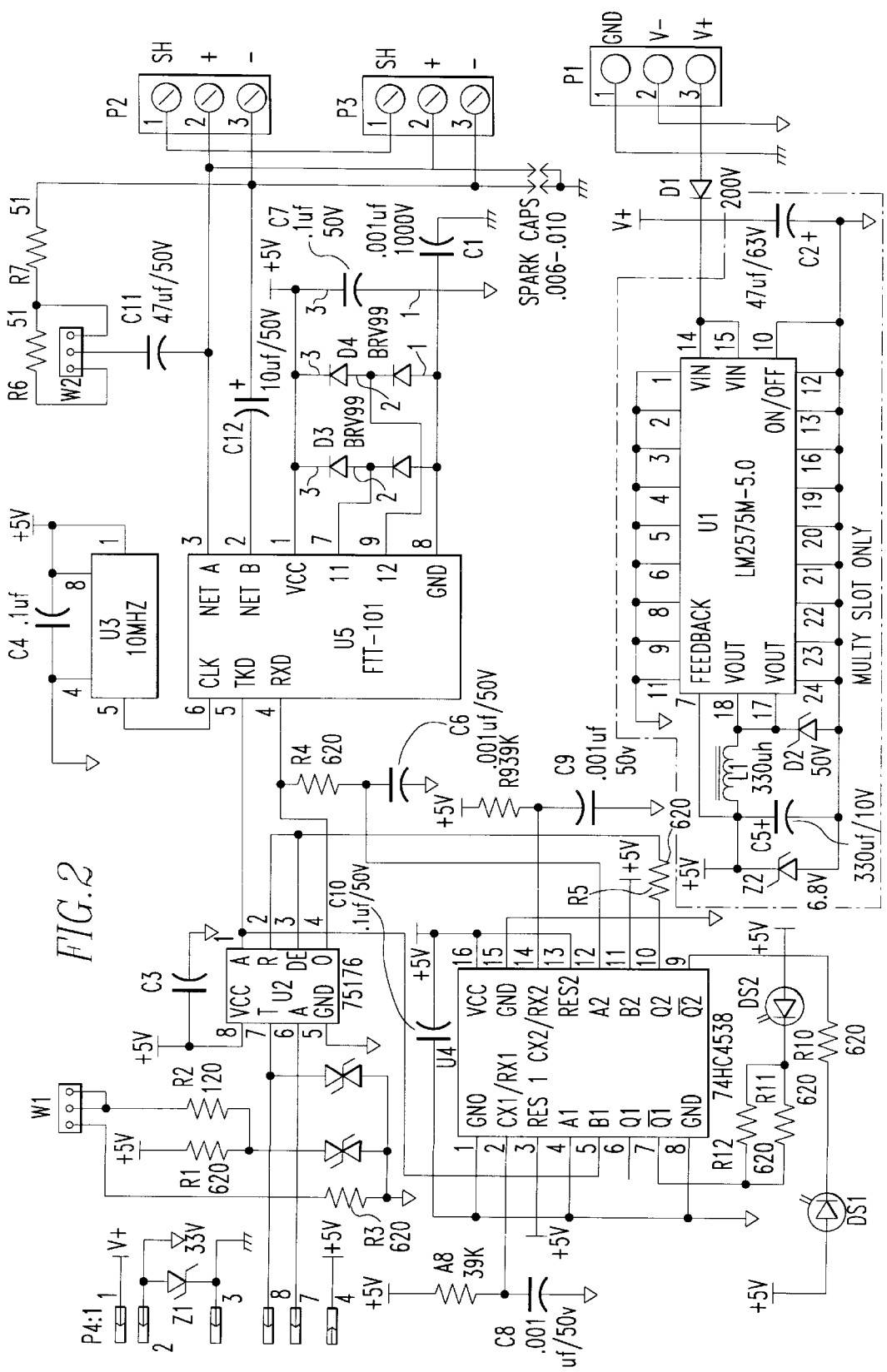
FIG. 2 is a schematic representation of a circuit diagram of the present invention.

Referring to FIG. 2, the EIA485 transceiver (U2) function is to convert a transmitted single-ended Manchester encoded data stream from the FTT10A (U5) to a balanced line two wire differential network (P4 pins 7,8), which is considerably more resistant to induced common-mode noise than single-ended data, and convert a Manchester encoded received differential signal from the balanced line two wire differential network to a single-ended data stream (U2) to the FTT10A (U5). The FTT10A converts the Manchester encoded data stream to/from a modulation format suitable for free topology networking.

The input resistors (R1,R3) bias the network for failsafe levels when no activity is occurring and (R2) for termination. The Transorbs (Z3,4) clamp overvoltage transients to safe levels.

The SN75176 EIA485 single-ended data output (U2 pin 1) is connected to the single-ended data input (U5 pin 5) of the FTT10A free topology transceiver. The local 10 Mhz clock is connected to the FTT10A (pin 6). The FTT10A has local clamping (D3,4), DC decoupling (C12), and termination (C11, R6,7, W2) for the free topology network connection.

The Manchester encoded single-ended data output of the FTT10A (U5 pin 4) is connected to the single-ended data input of the EIA485 transceiver (U2 pin 4), and via an optional single pole noise filter (R4,C6) to the rising edge trigger of a 74HC4538 retriggerable multivibrator (U4 pin 12). The purpose of the multivibrator (U4) is to switch the direction of the receive data enable (U2 pin 2) which is active low and the direction of the transmit data enable (U2 pin 3) which is active high, which are connected together and normally low during all periods except when the FTT10A is receiving data, to a high level. This will disable the reception of EIA485 data from the balanced line two wire differential network (P4 pins 7,8) and enable the passing of the single-ended data from the FTT10A to the balanced line two wire differential network (P4 pins 7,8) via the transmit data input of the EIA485 transceiver (U2 pin 4). This one-shot time period is nominally somewhat greater than 3 bit periods of the free topology network, with 2.5 bit periods defined as a timing violation and hence an end of packet indicator. As a result, the data flow from the FTT10A transceiver to the EIA485 transceiver will be continuously enabled until said timing violation.

The other output of the multivibrator (U4 pin 9) drives an LED (DS1) indicating when the FTT10A is receiving data.

The second multivibrator is used as a one-shot indication of data activity on the EIA485 network when the FTT10A is not receiving data via another LED (DS2).

Data Flow Description

In the quiescent state, the EIA485 transceiver is monitoring the multidrop network. The bias resistors (R1,R3) hold the multidrop in a marking state with the inverting input (U2 pin 7) low and the non-inverting input (U2 pin 6) high when no node is driving the multidrop. This is passed from the EIA485 transceivers' receive data output (U2 pin 1) to the FTT10A transmit data input (U5 pin 5) which knows that the lack of transitions on its input is indicative of no node transmitting traffic on the multidrop network. The receive data output of the FTT10A (U5 pin 4) is normally low when no incoming traffic is present on the Free Topology network.

The FTT10A's receive data output (U5 pin 4) is connected to the retriggerable multivibrators' rising edge trigger input (U4 pin 12) via a low pass noise filter (R4,C6) and is normally low when no incoming traffic is presently on the Free Topology Network. As a result, the multivibrator is not triggered and its inverting output (U4 pin 9) is high and the FTT10A LED (DS1 via R10) is not illuminated. Its non-inverting output (U4 pin 10) is connected to the EIA485 transceivers' active low receive enable (U2 pin 2) and the active high transmit enable (U2 pin 3) and this places the EIA485 transceiver in the receive state. Its receiver output (U2 pin 1) is normally high when no node is driving the multidrop network. The FTT10A's receive data output (U5 pin 4) is also connected to the EIA485 transceivers' transmit data input (U2 pin 4). This is the quiescent state of the Modem.

The EIA485 transceiver located on each node is normally kept in the receive state by that node. When a node sends a packet of data, the node enables its EIA485 transceiver (pin 3) and its transmitter then drives its inverting output (pin 7) high and its non-inverting output (pin 6) low which therefore drive the multidrop network thereby distributing the data to the other nodes and the EIA485 transceiver on the modem. The modems' EIA485 transceivers' output (U2 pin 1) will go low whenever the multidrop network is driven with a space signal (the inverting input high and the non-inverting input low. These low excursions on the EIA485 transceivers output are sensed by the FTT10A transmit data input (U5 pin 5) which passes the data packet over the Free Topology network. Additionally, the EIA485 transceivers' receiver output is connected to a first multivibrators negative trigger input (U4 pin 5) whose inverting output (U4 pin 7) illuminates the 485 LED (DS2 via R11,R12) whenever the multidrop network is driven to the non-quiescent state (which causes the transceivers' receiver output to go low whenever the FTT10A (U5) is not receiving data from the Free Topology network). The invention does all this for any and all messages transmitted from nodes located on the modems' EIA485 multidrop subnetwork. Any collisions occurring from two or more nodes attempting to communicate at the same time are handled within the protocol used by the nodes.

When a data packet is received from the Free Topology network, the FTT10A asserts its receive data output (U5 pin 4) high. This output, which is connected to the EIA485 transceivers' transmit data input (U2 pin 4) and the retriggerable multivibrators rising edge trigger input (U4 pin 14), causes the multivibrators inverting output to go low thereby illuminating the FTT10A LED (DS1 via R10) and the non-inverting output to go high, thereby disabling the EIA485 transceivers' receiver output (U2 pin 1) via the receiver enable (U2 pin 2) and enabling the EIA485 transceivers' transmitter via the transmit enable (U2 pin 3). The EIA485 transceivers' transmitter drives its inverting output high (U2 pin 7) and its non-inverting output low (U2 pin 6) which therefore drives the multidrop network and thereby distributes the data to the nodes (who normally keep their EIA485 transceiver in the receive state).

On every subsequent rising edge of the FTT10A's receive data output, the retriggerable multivibrators' trigger input causes an extension of the on time of the multivibrator and hence an extension of the modems' EIA485 transceiver transmit enable (U2 pin 3). The multivibrators' time out period is nominally set for approximately three bit times at 78 Kbaud since the end of packet is signaled, by definition, by a 2.5 bit time, no activity, timing violation. Since a Manchester encoding scheme is used, this time period must exceed the longest valid bit time window of either polarity.

Figure 3:
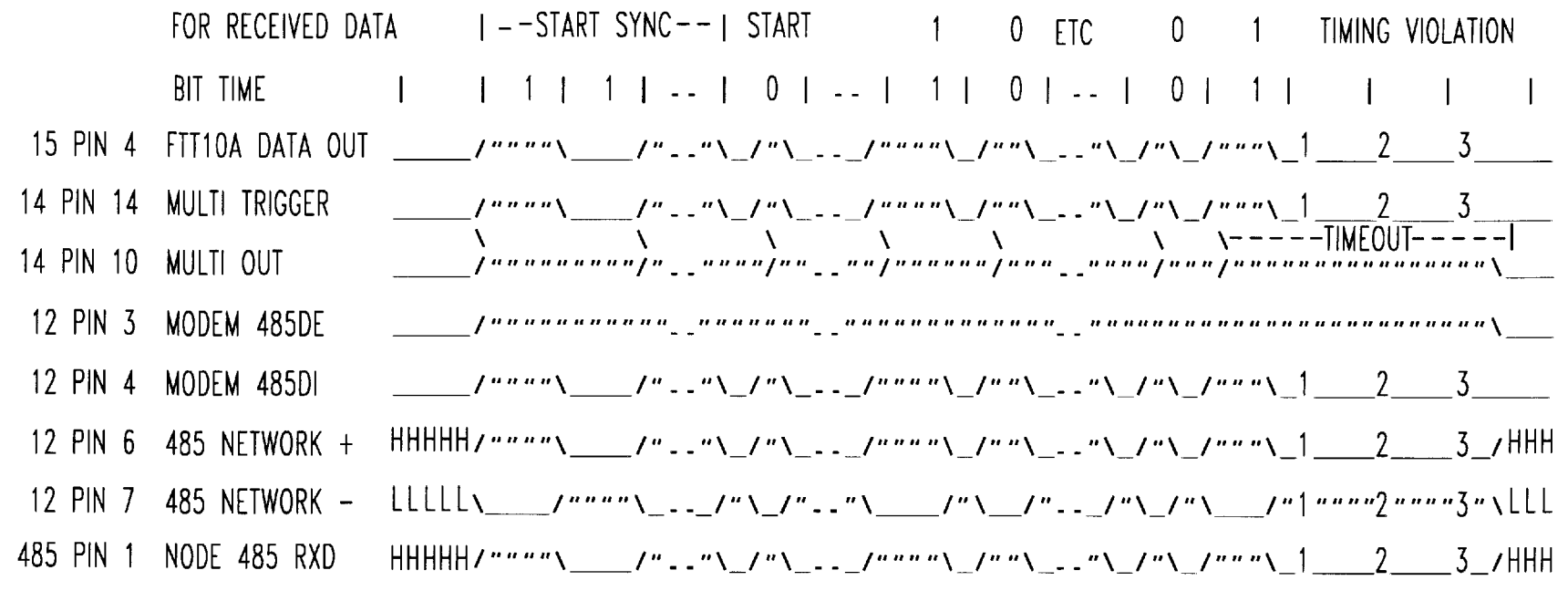
Figure 4:
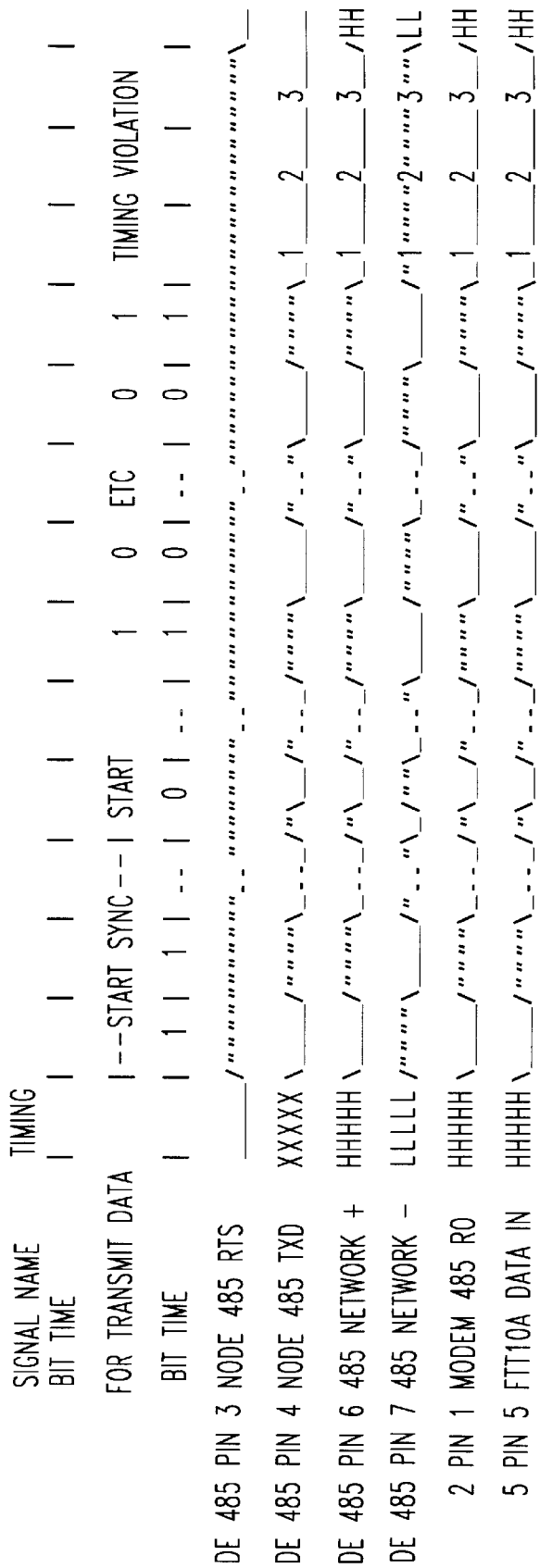
FIG. 4 are graphs representing transmitted data of the present invention regarding FIG. 2.

When the retriggerable multivibrator times out, after the aforementioned quiet periods on the Free Topology network, the modem circuit immediately reverts back to the quiescent condition described above. FIGS. 3 and 4 show the timing regarding the circuit for received data and transmitted data, respectively.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A system for transmitting data comprising:
   a network on which transmission of data occurs;
   a first node;
   a second node; and
   a shared modem connected to the network and the first and second nodes for transmitting signals from the first and second nodes, said modem receives signals for the first and second nodes; and
   a directional control mechanism connected to the network and the modem, said modem for controlling when the nodes can receive signals from the modem, the directional control mechanism includes an edge detect circuit which detects when data is received by the modem from the network.

2. A system as described in claim 1, wherein each node includes a balanced line differential transceiver.

3. A system as described in claim 2 wherein the directional control mechanism includes a multi-vibrator which enables data from the network to pass through the modem to the nodes.

4. A system as described in claim 3 wherein the modem includes an FTT10A transceiver connected to the multi-vibrator.

5. A system as described in claim 4 wherein each balanced line differential transceiver is an EIA485.

6. A system as described in claim 5 including a balanced line two-wire differential network connected to each EIA485.

7. A method for transmitting data comprising the steps of:
   transmitting data from a first node on a balanced line two-wire differential network to a modem;
   transmitting the data from the first node to a free topology network on which transmission of data occurs with the free topology modem;
   transmitting data from a second node on the balanced line two-wire differential network to the modem;
   transmitting the data from the second node to the free topology network with the modem; and
   receiving data from the network at the transceiver; detecting a leading edge signal of data from the network at the modem; allowing the data from the network to pass to the first and second nodes; and transmitting the data from the free topology modem to the first and second nodes.

8. A method as described in claim 7 wherein after the step of detecting a leading edge signal of data, there is the step of causing the modem to revert to a quiescent state which allows data from the first and second nodes to pass to the modem and be sent to the network by the modem.

* * * * *